UNITED STATES PATENT OFFICE.

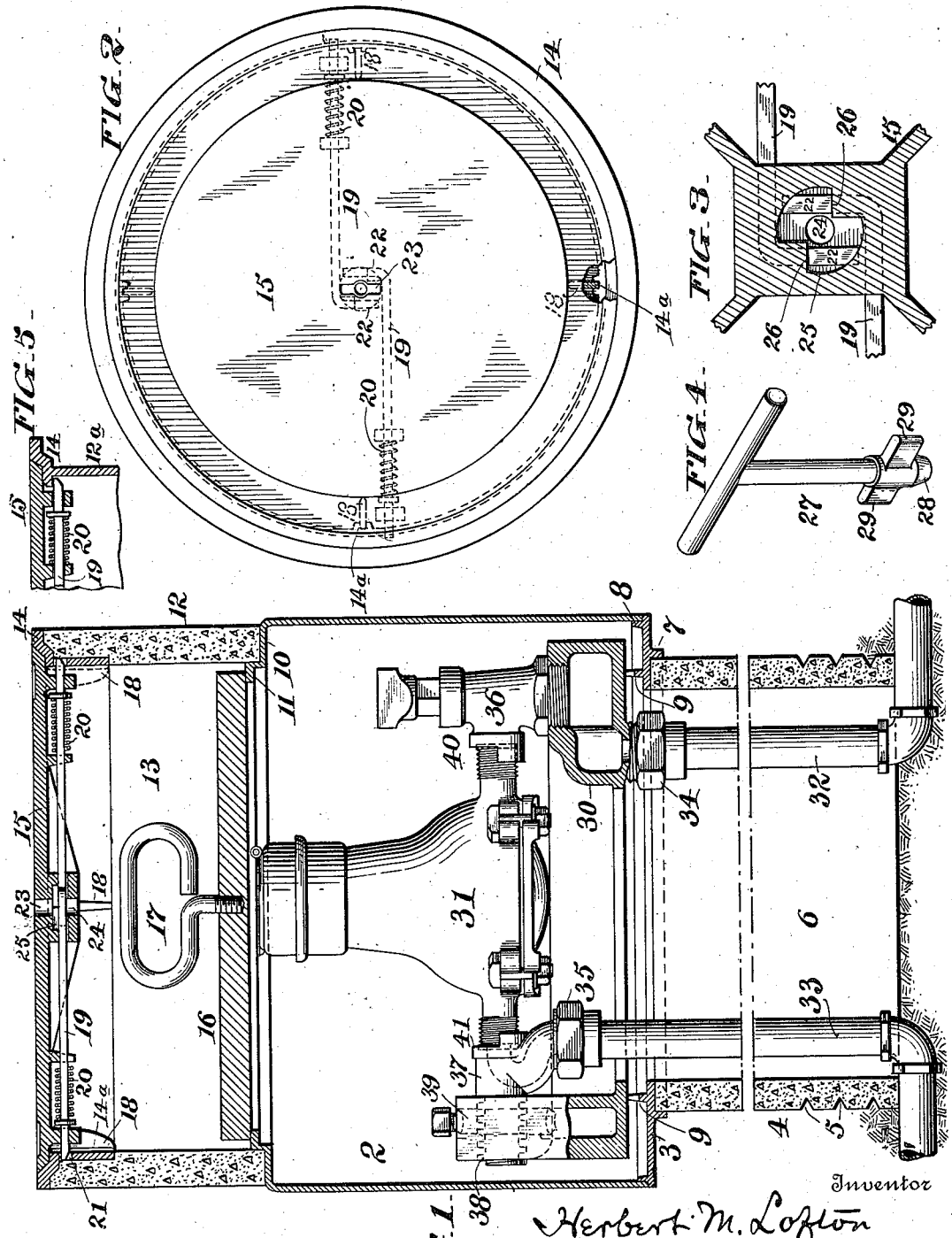

HERBERT M. LOFTON, OF CHATTANOOGA, TENNESSEE.

METER-BOX.

1,204,464.   Specification of Letters Patent.   Patented Nov. 14, 1916.

Application filed May 25, 1914. Serial No. 840,689.

*To all whom it may concern:*

Be it known that I, HERBERT M. LOFTON, citizen of the United States, and resident of Chattanooga, county of Hamilton, and State of Tennessee, have invented an Improvement in Meter-Boxes, of which the following is a specification.

My invention has for its object certain improvements in meter box installation embodying the casing structure, and also the means for supporting the meter in an elevated relation in respect to the bottom of said casing. In this respect I provide a concrete or non-metallic casing adapted to be made in various heights to suit the distance of the water pipes below the pavements, the construction being such that the concrete casings may be made at the place of installation to avoid the cost of freight and transportation charges to a large extent; and moreover, to provide an indestructible form of casing of non-metallic material surmounted with a metallic top and a sealing lid or cover of a character which will prevent its easy removal.

My object is also to so form the meter box that the lower portion, preferably of refractory or non-corrodible material, shall support a meter chamber, preferably of metal, in which the meter is installed, said chamber being sufficiently near the pavement that the meter may be read and it may be reached with the hands when necessary for adjustment; and also that the meter may be supported greatly above the bottom of the casing where connection is made with the water mains, whereby it is not liable to injury by accumulations of water and dirt.

My object is further, to provide a construction of meter box in which the meter is inclosed in a chamber arranged at a sufficient depth below the street to prevent freezing while well above the damp lower portion of the box where the connection is made with the the street and house water mains leading into the box, and said meter further shielded from exposure to cold by a cover, preferably formed of a non-conductor of heat arranged above the meter chamber and constituting the bottom of a dead air space or upper chamber located between the meter chamber and the street.

My improvements are fully described hereinafter and more particularly defined in the claims. These improvements will be better understood by reference to the drawings, in which:—

Figure 1 is a sectional elevation of a meter box and casing embodying my improvements; Fig. 2 is a plan view of the same; Fig. 3 is a sectional plan view of a portion of the locking devices of the top or cover plate; Fig. 4 is a perspective view of a key for unlocking the cover plate; and Fig. 5 is a sectional elevation showing a modified construction at the top of the meter box.

2 is a cast metal box, inwardly flanged at the top as at 10 and constituting the meter chamber. This box 2 rests upon an annular base plate 3 having annular flanges 7 and 8, the former extending downward and the latter upward and centralizing the box 2 upon the base. This base rests upon the upper end of a vertical tubular part 4 formed preferably of concrete or terra-cotta which is both light and cheap, said tubular part providing a vertical chamber 6 below the meter chamber. When this tubular part is made of refractory or non-corrodible material, such as terra-cotta or concrete, I prefer to form it with one or more circumferential grooves 5 which act as guides for fracturing the tubular part when it is desired to reduce the height of the meter box as a whole. These grooves 5 are preferably formed upon the outer side. By splitting off the lower portion on the line of one of the grooves 5, the exact height of the meter box structure as a whole may be varied to suit the distance of the water main below the street level.

Resting upon the flange 10 of the top of the box 2 is the upper tubular section 12, this being centralized by the construction of the metal flange part 11 of the cast box structure 2. I may form this section 12 of concrete or other refractory material, as shown in Fig. 1, or of metal as indicated in Fig. 5, in which a portion only is shown at 12$^a$. This section 12 is relatively short and reaches from the pavement to the box 2, a distance which preferably can be reached by the arm of a person lying upon the pavement.

When the section 12 is of concrete or refractory material, the upper end is fitted with a cast metal cap or rim bushing. In practice, the concrete is molded upon this metal cap or rim 14 which extends down into the inner wall as a bushing. By employing the cap bushing of metal over the top of the concrete box and thoroughly embedding the same therein to rigidly secure the said cap bushing to the concrete, not only is the concrete thoroughly protected and strengthened at the top, but a clean metallic boundary is provided for the cover plate, and against which the cement or other paving may be built to give a desirable surface appearance.

The cap bushing 14 is provided with a plurality of vertical grooves 14ª in its interior side walls, the said grooves being preferably arranged in pairs diametrically opposite each other. The upper part of the cap bushing extends radially over the concrete, so as to fully protect the same and provide an annular recess for receiving the cover plate 15. This cover plate 15 is flanged on its under side, and said flanges are extended downwardly as at 18 and fit into the vertical grooves 14ª of the bushing. By means of this construction, and more particularly in respect to the deep flanges 18 and the great vertical length of the grooves 14ª, in which the flanges fit, it will be evident that the cover plate cannot be tilted upward and thereby be displaced from its position, as would be the case if there were no deep flanges employed. By the construction here shown, it will be essential in removing the cover plate to bodily lift it vertically for a considerable distance, that is a distance approximately equal to the depth of the flanges 18, because these flanges are locked in the grooves whenever attempt is made to tilt the cover plate. Because of this necessity of great vertical lifting of the cover plate to remove it for providing access to the meter box, it is evident that no one without the proper tools will be able to remove the cover to tamper with the meter.

If the expense of installation is not required to be too low, I prefer to provide the cover plate 15 with locking devices, such as are clearly shown in the drawings. 19 are two bolts guided on the under side of the cover plate and spring pressed outward by the springs 20. The inner ends of the bolts are arranged at right angles as at 22 (Figs. 2 and 3), so as to lie parallel on opposite sides of the key slot 23. These ends 22 are guided in a key chamber 25 having the long key slot 23 at the top and a centering hole 24 at the bottom. The key is shown in Fig. 4, and consists of the shank 27 having the wings 29 and axial end bearing 28. When this key is pushed through the key slot, the wings pass between the ends 22 of the bolts and the lower axial end 28 centers in the hole 24. Upon turning the key, the ends 22 of the bolts are moved apart and the bolts withdrawn. The shoulders 26 in the key chamber 25 limit the rotation of the key when the bolts are fully withdrawn. The ends of the bolts may enter holes 21 in the cap bushing 14 (Fig. 1), or may engage a flange as shown in Fig. 5. The key can only be removed when the bolts are in locking position so that the locking of the cover plate 15 in position is assured.

Resting upon the annular flange 11, is the cover or partition 16, preferably of wood or other non-conductor of heat, said cover sealing the box 2 from above, and having a handle 17 by which to lift it when access is required to the box chamber 2 in which the meter 31 is located. Between this cover 16 and the cover plate 15 is the chamber 13 which acts as a dead air space and prevents circulation of cold air down through the meter chamber 2. The depth of this chamber 13 should preferably be such that the meter 31 may be read or reached from the street and without getting down into the meter box structure. I have shown the meter box as circular in plan, but I do not restrict myself to this shape.

32 is the water supply pipe or street main and 33 is the house main; these pipes enter through the bottom of the tubular part 6 of the casing and extend upward to the meter chamber 2. In this chamber 2 the meter 31 may be supported in any suitable manner and have its ports in communication with the upper ends of the respective pipes 32 and 33. In the preferred form, this connection and support of the meter is as follows: An annular frame 30 rests upon the flanges 9 of the base 3 of the box 2, and has an inlet union 34 to which the inlet pipe or street main 32 connects, and also has an outlet union 35 to which the house main 33 connects. The meter 31 is clamped between tubular sockets 40 and 41 respectively in communication with the inlet and outlet portions of the frame 30, as shown in Fig. 1. The meter is detachably connected in practice, so as to be replaced or removed, but I do not in this application, make any claim to the particular means for detachably clamping the meter in place, as that forms the subject of another application. By having the pipes 32 and 33 extended upward, they provide great flexibility whereby the upper end of the pipe 33 may be moved slightly toward or from the pipe 32 to permit the proper clamping and unclamping of the meter 31. The part 37 having the clamping socket 41, is adjustable horizontally by means of its screw 38 and the rotatable nut 39, and is also provided with the union 35 for connection with the house main 33. The water on the inlet side may be shut off by a cock 36, when the meter is removed. All of these features are, however, more fully set out in said other application and will need no further description here.

I have shown my improvements in the form which I prefer in practice, but I do not limit myself to the details, as these may be modified or varied without departing from the spirit of the invention.

Having now described my invention, what I claim as new and desire to secure by Letters Patent, is:—

1. In a meter box structure, a tubular concrete case having a metallic cap bushing rigidly attached thereto at its upper end and extending over the top and down upon the interior and providing an annular beveled upper recess, in combination with a removable cover plate having a beveled perimeter fitting the annular bevel of the cap bushing having deep flanges extending downward within the bushing and fitting the side walls thereof.

2. In a meter box, a tubular case made of three separable sections superimposed one upon the other and the middle section having a bottom flange portion, combined with a cover plate for the top of the upper section, a device through which the water flows wholly supported upon the flange portion of the middle section, and downwardly extending pipes extending from below the bottom section up to and detachably connected with the device through which the water flows.

3. In a meter box, a tubular case made of three separable sections superimposed one upon the other and the middle section having a top inwardly directed annular flange and also a bottom flange portion, combined with a cover plate for the top of the upper section, a cover of heat non-conducting material loosely resting upon the annular top flange of the middle section, a device through which the water flows wholly supported upon the flange portion of the middle section, and downwardly extending pipes extending from below the bottom section up to and detachably connected with the device through which the water flows.

4. A meter box, consisting of a vertical tubular casing structure having its top and bottom portions formed of refractory material reinforced at the top by a metallic rim part and having at the lower part a plurality of circumferential weakening grooves, combined with a removable cover plate resting upon the reinforced upper rim part.

5. A meter box, consisting of a vertical tubular box structure formed of a plurality of interlocking sections arranged one upon the other and having the lowermost section formed of refractory material and provided with a plurality of circumferential weakening grooves, combined with a removable cover plate resting upon the upper part.

6. In a meter box, a tubular case having inwardly extending supports intermediate of its upper and lower ends, combined with a cover plate for the top, a device through which water flows wholly supported upon the inwardly extending supports whereby it is sustained by and within the case intermediate of its top and bottom, two vertical pipes extending from below the case and up to the device through which water flows, and separate unions between each pipe and the device.

7. A meter box formed of a plurality of sections comprising a middle meter box chamber, a lower tubular chamber supporting the meter box chamber, and a top tubular section, combined with a top cover plate, and a removable cover between the top tubular section and the meter box chamber.

8. A meter box formed of a plurality of sections comprising a middle metallic meter box chamber, a lower refractory tubular chamber supporting the meter box chamber, and a top tubular section, combined with a top metallic cover plate, and a removable cover of non-conducting material between the top tubular section and the meter box chamber.

9. In a meter box, a tubular casing comprising a plurality of sections of which the top and bottom sections are of concrete and the middle section of metal of larger internal diameter and formed of a bottom flange resting upon the top of the lower section and outwardly extending, and a body portion supported upon the perimeter of the flange and having at its top an inwardly directed annular flange upon which the upper concrete section is supported.

10. A meter box, consisting of a chamber, combined with a separate tubular part of smaller diameter extending down from the chamber and mechanically supporting it and open at the bottom for the water mains, an upper separate tubular part supported by the chamber, a cover plate for the top of the upper tubular part, and a cover between the chamber and the upper tubular part.

11. A meter box, consisting of a vertical tubular structure having a removable cover plate at the top, combined with street and house mains extending into the bottom of the structure and projecting upward to a place greatly above the bottom and free from the vertical tubular structure, and a support for a device through which the water flows having communication with the upper ends of the street and house mains and supported by the tubular structure independently of the mains.

12. In a meter box, a tubular casing comprising a plurality of sections of which the top and bottom sections are of concrete and the middle section of metal of larger internal diameter and formed of a bottom flange resting upon the top of the lower section and outwardly extending, and a body portion supported upon the perimeter of the flange and having at its top an inwardly directed annular flange upon which the upper concrete section is supported, combined with a removable cover plate for the top of the top section, and a second cover of smaller diameter for the top of the middle section and resting upon the inwardly directed annular flange, a device through which water flows of larger diameter than the lower section and supported upon the bottom flange of the middle section and within said section, and upright pipes extending upward through the lower section and detachably connected with the device in the middle section.

13. In a meter box, the combination of the tubular box structure, a support for a device through which the water flows, a removable cover plate for the box having a key chamber, and locking means for the cover plate consisting of two bolts extending in opposite directions and having transverse ends extending into the key chamber, springs to force the bolts outward, and a key having opposite wings for respectively acting upon the transverse ends of the bolts to withdraw them against the action of the springs.

14. In a meter box, the combination of the tubular box structure, support for a device through which the water flows, a removable cover plate for the box having a key chamber provided with a key slot and stops arranged at an angle to each other, and locking means for the cover plate consisting of two bolts extending in opposite directions and having transverse ends extending into the key chamber and parallel to and on opposite sides of the key slot, springs to force the bolts outward, and a key having opposite wings for respectively acting upon the transverse ends of the bolts to withdraw them against the action of the springs, the construction being such that the key cannot be withdrawn without putting the bolts into locking positions.

15. In a meter box, a case open at top and bottom and having an inwardly directed supporting part at a great distance from both the top and bottom, a removable cover plate for the top, a device through which water flows wholly supported upon the inwardly directed supporting part, water mains having upwardly extending ends leading up to and detachably connected to the device through which the water flows and said pipes suspended thereby.

16. In a street meter box, a tubular non-metallic bottom section, combined with a cast metal section resting upon the top of the non-metallic bottom section, two covers at a distance apart the upper one at the level of the street and the lower one supported directly by the cast metal section, water mains extending vertically upward into the lower section, and a device through which water flows arranged below the lower of the covers and well above the bottom of the lower section and in communication with the upper ends of the vertical pipes.

In testimony of which invention, I hereunto set my hand.

HERBERT M. LOFTON.

Witnesses:
 W. J. DODGE,
 L. S. McCULLOHS.